Figures 1, 2:
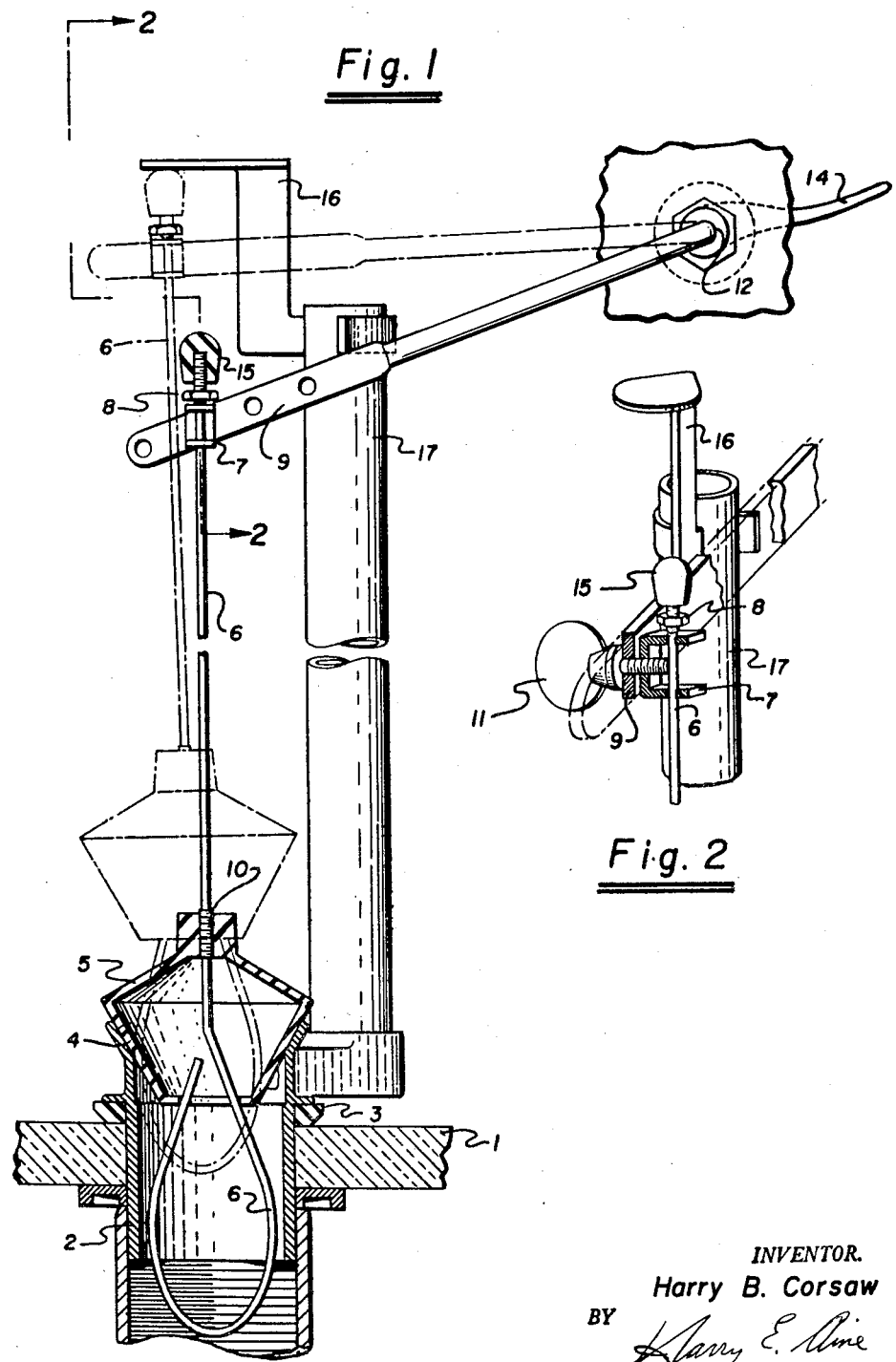

Dec. 18, 1962  H. B. CORSAW  3,068,489
BALL VALVE GUIDE APPARATUS
Filed Feb. 17, 1960  5 Sheets-Sheet 1

INVENTOR.
Harry B. Corsaw
BY
Attorney

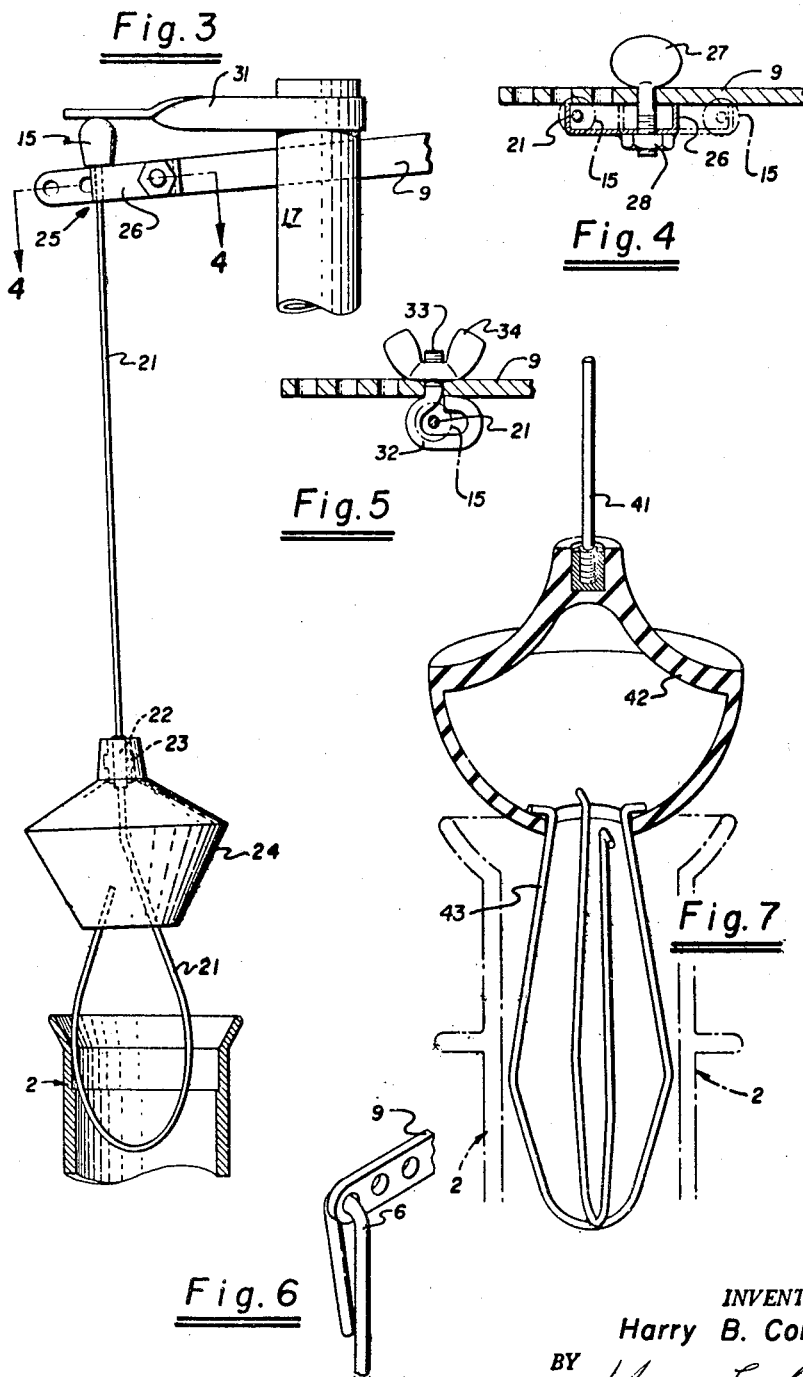

Dec. 18, 1962  H. B. CORSAW  3,068,489
BALL VALVE GUIDE APPARATUS
Filed Feb. 17, 1960  5 Sheets-Sheet 3

INVENTOR.
Harry B. Corsaw
BY
Attorney

Dec. 18, 1962  H. B. CORSAW  3,068,489
BALL VALVE GUIDE APPARATUS
Filed Feb. 17, 1960  5 Sheets-Sheet 4
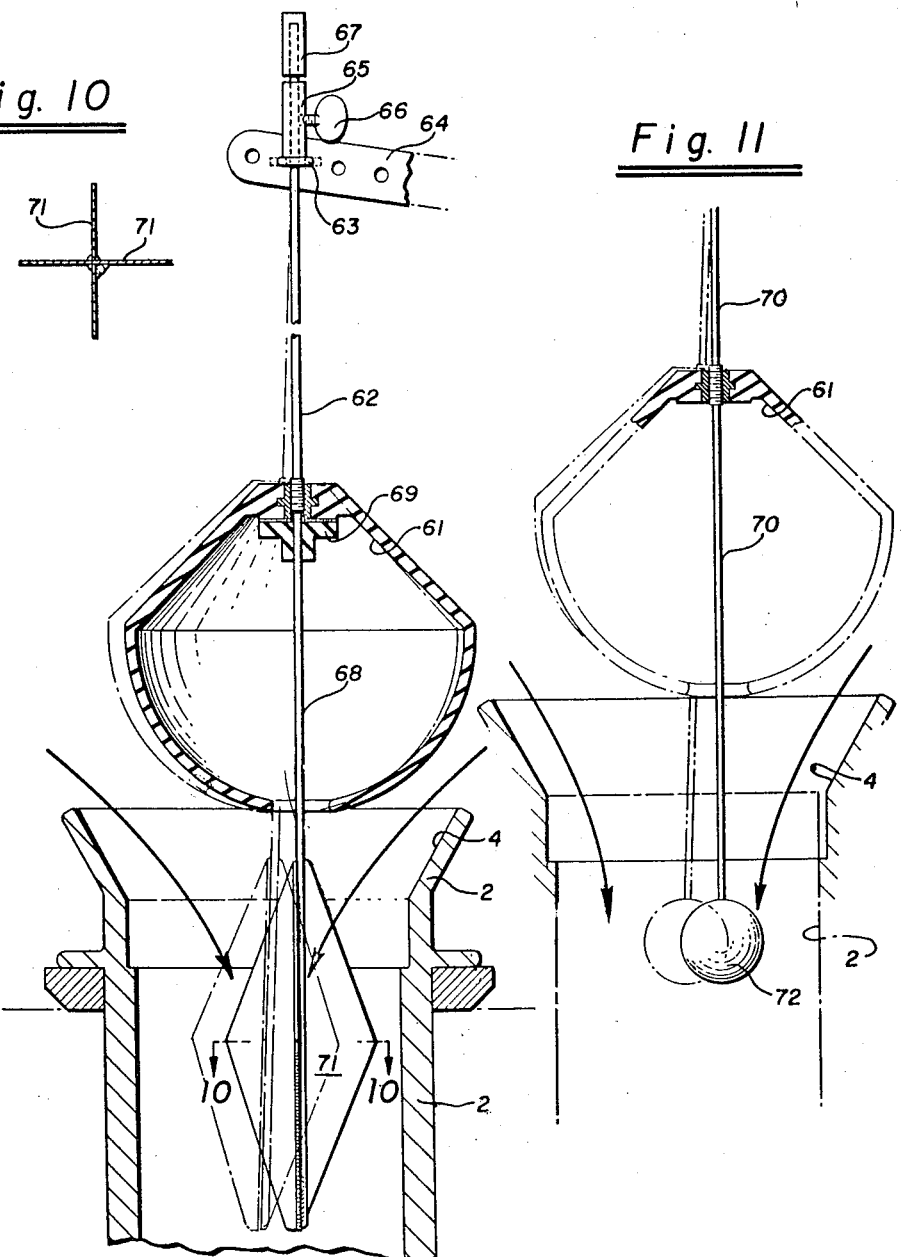
INVENTOR.
Harry B. Corsaw
BY
Attorney

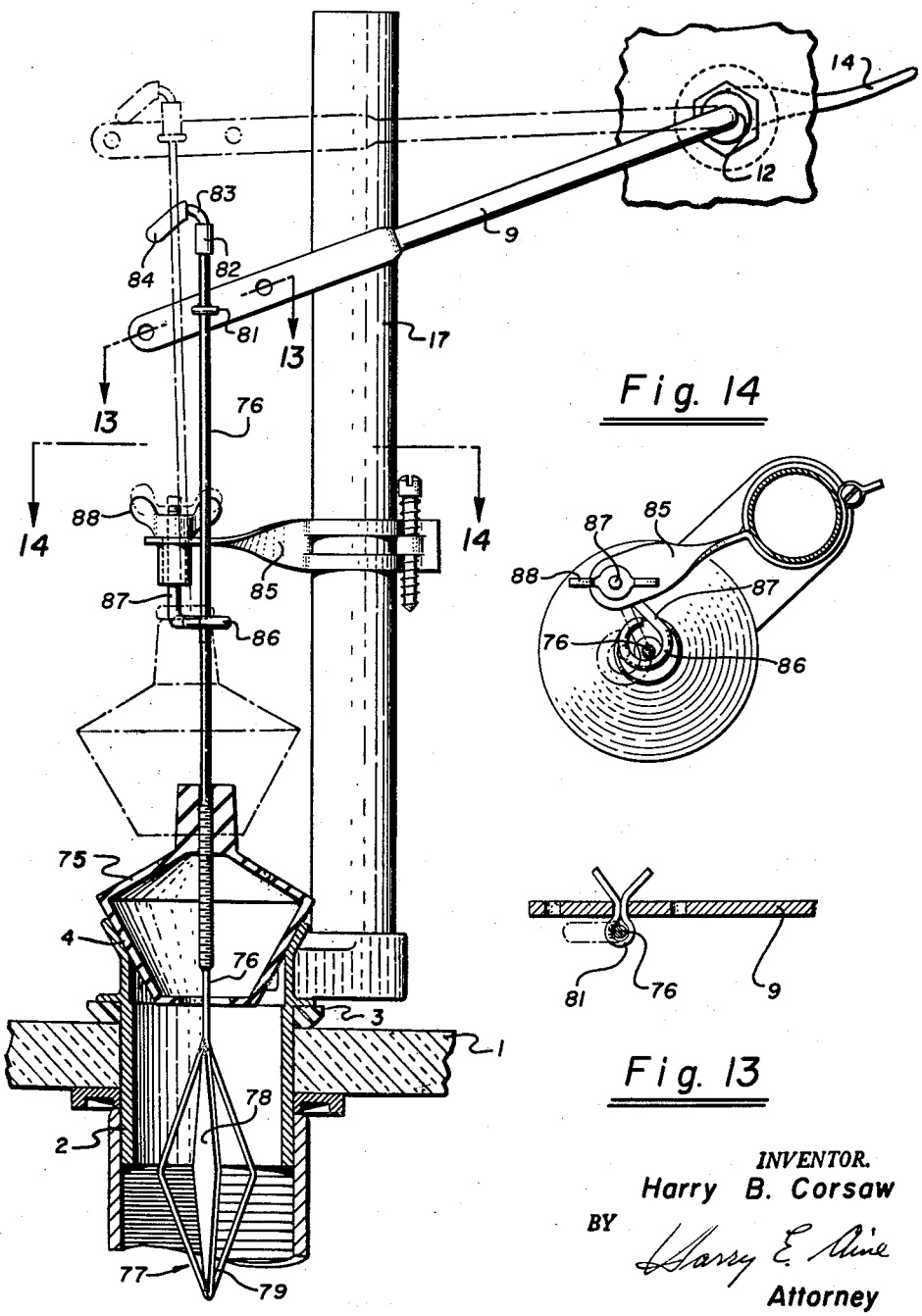

United States Patent Office 3,068,489
Patented Dec. 18, 1962

3,068,489
BALL VALVE GUIDE APPARATUS
Harry B. Corsaw, 4159 El Camino Way,
Palo Alto, Calif.
Filed Feb. 17, 1960, Ser. No. 9,305
5 Claims. (Cl. 4—57)

The present invention relates in general to ball valves and more particularly to a novel ball valve guide apparatus which is especially useful in toilet flush tanks for assuring proper seating of the flush valve thereby eliminating undesired water waste and attendant annoying noises.

Heretofore ball valve guides have been proposed which were adapted to be resiliently connected to the ball valve and to extend downwardly therefrom into the water discharge pipe. However, these prior art sliding ball valve guides have generally proven to be less than fully satisfactory because they were designed to cooperate with a second guide usually in the form of a sleeve disposed above the ball valve in slidable engagement with the valve stem. In the prior art devices neither the upper nor the lower ball valve guide provided sufficient guidance for the ball valve over substantially the entire rectilinear translation thereof. Instead, these upper and lower guides were designed to cooperate in such a manner that the upper guide was to provide sufficient guidance for the initial downward travel of the ball valve to a point where the lower guide could be properly engaged to assure guidance of the ball valve in its final stages of descent into the valve seat. Experience has shown that the upper valve guide fails to provide sufficient guidance for the initial descent of the ball valve such that the lower ball valve guide device may hang up on the valve seat or on other portions of the guiding apparatus.

The present invention provides an extremely inexpensive and simple ball valve guide device which is resiliently affixed to the ball valve and extends below the ball valve to provide positive guidance throughout substantially the entire rectilinear translation of the ball valve whereby positive seating of the ball in the valve seat is always assured.

The object of the present invention is to provide an extremely simple and inexpensive flush tank ball valve guide method and apparatus whereby proper seating of the ball valve in the valve seat is always assured.

One feature of the present invention is the provision of a lifting eye carried from the flush valve actuating lever, said lifting eye having slidable therethrough the upper portion of the valve stem whereby said lifting eye provides an upper ball valve guide cooperating with a lower ball valve guide resiliently depending from said ball valve into the water discharge pipe to assure proper seating of the ball valve within the valve seat.

Another feature of the present invention is the provision of a valve travel stop clamped to the overflow pipe and having a portion positioned over the valve stem to limit the rectilinear travel of the ball valve to a certain predetermined extent thereby preventing disengagement of the ball valve guide mechanism with the discharge pipe.

Another feature of the present invention is the provision of a sound deadening bumper on the upper extremity of the valve stem to eliminate undesired metallic noises accompanying operation of the flush valve.

Another feature of the present invention is the provision of a non-laterally restraining ball valve upward travel limit stop adapted to receive the valve stem passable therethrough and being carried from the overflow pipe. Said limit stop serving to limit the upward movement of the ball valve by engaging said ball valve at the valve's uppermost extent of travel.

Figure 8:
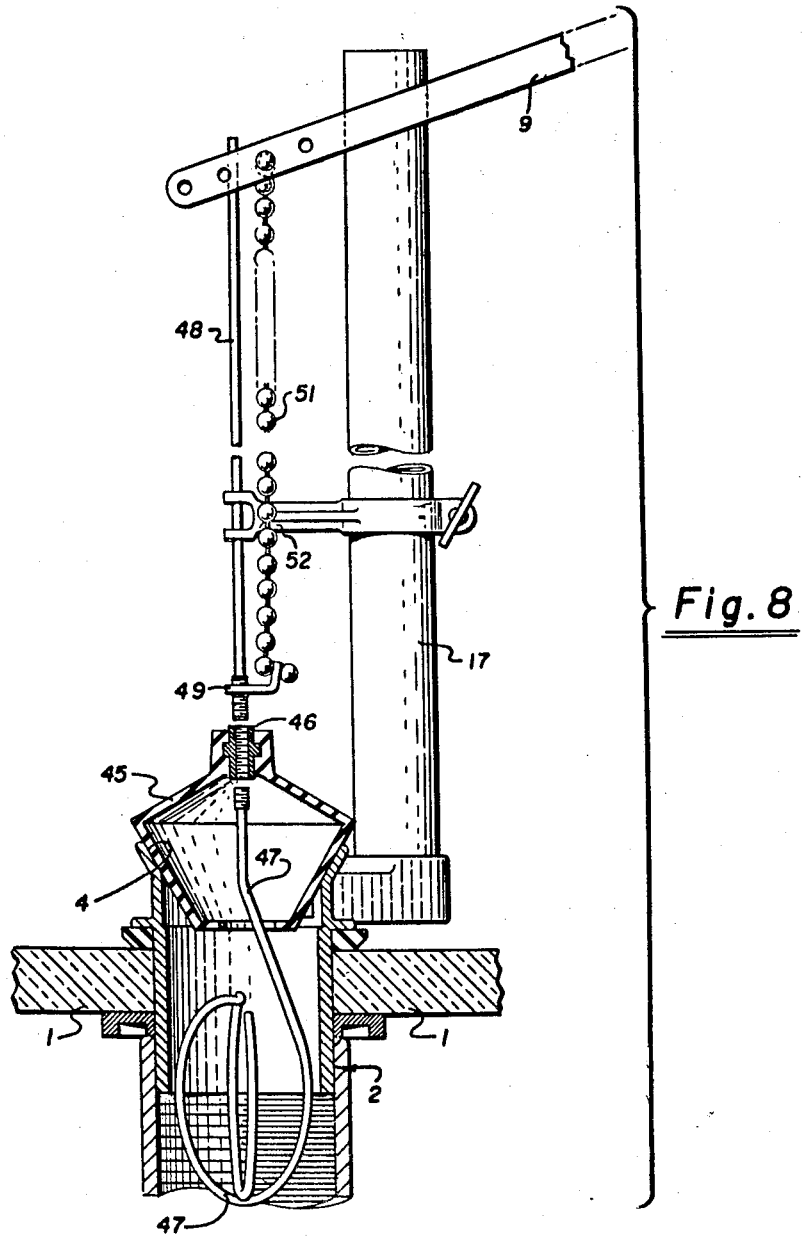

Other features and advantages of the present invention will become apparent upon a perusal of the specification taken in connection with the accompanying drawings wherein;

FIGURE 1 is a side elevational view partly in cross section and partly in phantom depicting a toilet ball valve assembly utilizing features of the present invention, FIGURE 2 is an enlarged fragmentary perspective view of a portion of the structure of FIGURE 1 taken along line 2—2 in the direction of the arrows, FIGURE 3 is a fragmentary side elevational view, partly in cross section, of certain alternative features to the structure depicted in FIGURE 1, FIGURE 4 is an enlarged cross sectional detail view of a portion of the structure of FIGURE 3 taken along 4—4 in the direction of the arrows, FIGURE 5 is an alternative embodiment of certain features of the structure of FIGURES 3 and 4, FIGURE 6 is an alternative embodiment for certain features of the structure depicted in FIGURE 4, FIGURE 7 is an enlarged side elevational perspective view, partly in cross section, of an alternative ball guide feature of the present invention, FIGURE 8 is a side elevational cross sectional view of an alternative ball guide apparatus of the present invention, FIGURE 9 is a fragmentary partial cross sectional view of a flush valve assembly incorporating features of the present invention, FIGURE 10 is a cross sectional view of a portion of the structure of FIGURE 9 taken along line 10—10 in the direction of the arrows, FIGURE 11 is a side elevational view partly in cross section and partly in phantom showing a portion of a flush valve assembly incorporating features of the present invention, FIGURE 12 is a side elevational view partly in cross section and partly in phantom depicting a ball valve assembly utilizing features of the present invention, FIGURE 13 is a cross sectional view of a portion of the structure of FIGURE 12 taken along line 13—13 thereof in the direction of the arrows, and FIGURE 14 is a cross sectional view of a portion of the structure of FIGURE 12 taken along line 14—14 thereof in the direction of the arrows, Referring now to FIGURES 1 and 2 there is shown the inner workings of a toilet flush tank 1. A discharge pipe 2 is sealed at the bottom of the flush tank 1 via a suitable rubber gasket 3 and the discharge pipe 2 is provided with a flared entrance at the upper end thereof forming a frustoconical valve seat 4. The discharge pipe 2 is selectively sealed off at its upper end via the intermediary of a conventional movable hollow ball valve 5 as of, for example, rubber seated in the valve seat 4.

A valve stem 6 as of, for example, 3/32" diameter brass wire extends through the longitudinal axis of the ball valve 5 and at the point of passing through the ball is sealed thereto as by, for example, vulcanizing or by the rubber ball being threaded over a raised thread 10 on the valve stem 6. The lower extremity of the valve stem 6 is formed, for example, in a pear-shaped loop, the free end portion of the loop terminating inside the ball valve 5. The maximum characteristic transverse dimension of the lower loop in the valve stem 6 is slightly less than the inside diameter of the discharge pipe 2 as of, for example, 75 to 95% of the inside diameter of the discharge pipe 2. The enlarged diameter of the loop portion of the valve stem 6 preferably extends to at least 2" to 3" below the beginning portion of the loop to assure positive guidance of the ball valve 5 throughout substantially the entire typical 2" to 3" of rectilinear translation thereof.

The upper portion of the valve stem 6 is inserted through aligned openings in the legs of a U-shaped lifting eye 7 selectively slidable upon the valve stem 6 and captured thereon by a nut 8 threaded over the upper extremity of the valve stem 6. The lifting eye 7 is pivotably carried from a flush lever 9 via a thumb screw 11 (see FIGURE 2) inserted through an enlarged opening in the flush lever 9 and threaded through an opening in the bottom of the U-shaped lifting eye 7. The thumb screw 11 is provided with a slightly enlarged threaded end to prevent the thumb screw from backing out of the lifting eye 7.

The flush lever 9 is pivoted at 12 and provided with an internal conventional stop, not shown, to prevent the flush lever 9 from dropping below a certain level into the flush tank. The other end of the flush lever 9, remote from the lifting eye 7, extends outside of the flush tank 1 and forms an actuating handle 14.

In operation, depression of flush lever handle 14 causes the lifting eye 7 to catch on the nut 8 and raise the ball valve 5 through the intermediary of the valve stem 6. Once the suction tending to hold the ball valve 5 in the valve seat 4 is broken, the buoyant ball valve 5 will rise to its upper most extent of travel. The ball valve travel is determined by engagement of the upper extremity of the valve stem 6 with either the cover to the flush tank 1, not shown, or in the case where the cover is too far removed in the vertical direction, with a valve travel stop 16 fixedly secured to a vertically directed overflow pipe 17 as by a resilient clamp portion thereof.

In a preferred embodiment of the present invention a sound deadening bumper 15 as of, for example, rubber is carried at the upper end of the valve stem 6 as by threading over the end thereof. The sound deadening bumper 15 eliminates the metallic noises otherwise produced when the valve stem engages the valve travel stop 16 or flush tank cover, not shown.

The maximum extent of vertical travel of the ball valve 5 is typically 2" to 3" and in the uppermost position the lower loop portion of the valve stem 6 remains within the discharge pipe 2 to assure positive guidance of the ball valve 5 throughout substantially its entire rectilinear translation.

The valve stem lifting eye 7 may operate in one of two modes. In a first operating mode, the adjustable thumb screw 11 is tightly threaded into the eye 7, the innermost end of thumb screw bearing against the valve stem 6 and thereby causing the valve stem 6 to be tightly bound at the aligned openings to the channel 7 which, in turn, is coupled to the flush lever 9. Thus, in this mode of operation, actuation of the flush lever 9 causes the lever to remain in the raised position and thus the handle 14 remains in a downward position while the flush tank empties. As the flush tank 1 empties, the flush handle 14 slowly rises as the flush lever 9 and valve 5 drop into position. To some persons, who are accustomed to the conventional sliding wire valve lifting apparatus (see U.S. Patent 2,512,924), it is bothersome to note that the flush handle 14 does not immediately come back to the raised position after actuation thereof.

Therefore, the valve stem lifting eye 7 is provided with a second mode of operation in which thumb screw 11 is loosened such that the valve stem 6 is freely slidable within the lifting eye 7 whereby after actuation of the flush handle 14 the flush lever 9 may immediately drop against the internal stop thereby raising the flush handle 14, exactly as encountered in the prior art typical flushing apparatus.

In both modes of operation of the lifting eye 7, the eye acts as a guide for the upper part of the valve stem 6 thereby eliminating the necessity of a separate valve stem guide as found in the prior art. The lifting eye 7 cooperates as a guide with the lower ball valve guide or loop portion of the valve stem to assure proper seating of the ball valve 5 in the valve seat 4.

Referring now to FIGURE 3 there is shown an alternative embodiment of the present invention in which the ball lifting eye 7 and valve travel stop 16 have been modified from the structure as shown in FIGURES 1 and 2.

A modified valve stem lifting eye 25 (see FIGURES 3 and 4) comprises a shallow channel member 26 provided with an opening in the bottom side of the channel closely spaced to one side thereof. The opening receives therethrough a thumb screw 27 from the open side of the channel 26, the thumb screw 27 also being inserted through a suitable selected opening in the flush lever 9 such that the center of the channel 26 will be approximately in vertical alignment with the center of the valve seat 4. A nut 28 is threaded over the threaded end of the thumb screw 27 behind the channel 26 thereby tightly clamping the channel 26 against the flush lever 9 to form the lifting eye defined by the boundaries of the channel member 26 and the flush lever 9. The channel lifting eye forms the subject matter of applicant's co-pending continuation in part application, U.S. Serial No. 167,847 filed January 22, 1962.

Due to the eccentric mounting of the channel member 26 a substantial amount of flexibility is obtained in obtaining the proper vertically aligned positioning of the open space of the lifting eye 25 with respect to the center of the valve seat 4 without providing an excessive number of openings in the flush lever 9. The vertical alignment flexibility is obtained by merely rotating the channel member 26 about the eccentrically disposed thumb screw 27 and tightening down the channel 26 against the flush lever 9 in a second position as indicated in phantom lines in FIGURE 4. The valve stem lifting eye 25 raises the ball valve 24 through the intermediary of the valve stem 21 by engaging the sound deadening bumper 15 or the nut 8 as indicated in phantom lines of FIGURE 4. Of course, after the ball valve 24 has been raised the flush lever 9 is free to drop immediately to its lowermost position because of the freely sliding engagement between the lifting eye 25 and the valve stem 21.

An alternative embodiment of the valve travel stop 16 of FIGURE 1 is shown in the structure of FIGURE 3. More specifically, the alternative valve travel stop 31 comprises a resilient band as of stainless steel having a partially looped portion provided at one end thereof forming a clamp for securing to the vertical overflow pipe 17. The remaining portion of the band 31 is horizontally directed and provided with a 90° twisted end portion providing a broad horizontal surface in vertical alignment with the valve stem 21 to provide the desired valve travel stop, by engaging the sound deadening bumper 15 at the upper extent of travel of the valve stem 21. This particular embodiment of the valve travel stop is particularly useful where the overflow pipe 17 is of sufficient length to permit the clamp portion of the stop 31 to be disposed in the horizontal plane of valve stem engaging portion of the valve travel stop 31.

Referring now to FIGURE 5 there is shown an alternative valve stem lifting eye embodiment of the present invention. More specifically, an elongated eye 32 is provided with a threaded stem 33 inserted in a suitable opening in the flush lever 9 substantially in vertical alignment with the center of valve seat 4. A wing nut 34 is threaded over the free end of the stem 33 and fixedly secures the eye 32 to the flush lever 9. The valve stem 21 rides within the eye 32 in free slidable engagement therewith. The valve stem 21 is raised by engagement of the lifting eye 32 with the sound deadening bumper 15 or nut 8 of FIGURE 1 indicated in phantom lines. The elongated eye 32 forms the subject matter of the aforementioned continuation in part application, U.S. Serial No. 167,847.

An alternative valve lifting apparatus is shown in FIGURE 6 wherein the upper extremity of the valve stem 6 is merely bent over in the form of a hook inserted within one of the openings in the flush lever 9, said opening being approximately in vertical alignment with the center of the valve seat 4. This embodiment has the advantage of extreme simplicity but its mode of operation includes the unconventional feature that the flush lever handle 14 remains in the depressed position until the ball valve 5 begins to drop with the receding water lever within the flush tank 1.

Referring now to FIGURE 7 there is shown another embodiment of the present invention. More specifically, a valve stem 41 provided with threads at the lower extremity thereof mates with the threaded insert in the conventional ball valve 42. The upper portion of the valve stem 41, not shown in FIGURE 7, may take any of the forms as shown in the previous FIGURES 1, 3 or 6 and be actuated in a manner as previously pointed in the above-mentioned figures. A multileg spider 43 as of, for example, $\frac{1}{16}''$ diameter brass wire is mounted in the inverted position with its leg portions upwardly extending into the hollow interior of the ball valve 42. The free end portions of the spider legs are outwardly directed and the leg portions of the spider 43 are outwardly tensioned such that the free end leg portions of the spider 43 grasp the ball valve 42 and form a resilient semi-rigid connection thereto.

The spider 43 is formed such that it has a characteristic transverse dimension near the lower extremity thereof which is slightly less than the diameter of the water discharge pipe 2, whereby positive guidance for the ball valve 42 is assured for substantially the entire rectilinear translation of the ball valve 42. The spider 43 has the advantage of being readily compatible with existing ball valve installations such that a new ball valve 42 need not be provided. The provision of a suitable spider 43 and perhaps a new valve stem 41 allows simple modification of the typical conventional flush valve apparatus to include features of the present invention thereby greatly enhancing the performance of the thus modified flush valve.

Referring now to FIGURE 8 there is shown an exploded view of another embodiment of the present invention. More specifically, a hollow ball valve 45 has a hollow internally threaded sleeve 46 as of brass fixedly sealed centrally of the ball valve 45 as by, for example vulcanizing. A lower ball valve guide 47 as of, for example, a $\frac{3}{32}''$ diameter brass wire is threaded at one end for mating with the internal threads of sleeve 46 and formed into a pair of quadraturally spaced loops at the other end thereof. The maximum characteristic diameter of said loop portions adapted to engage the inside walls of the discharge pipe 2 for guidance of said ball valve 45 for substantially the entire extent of rectilinear translation of said ball valve 45.

A valve stem 48 as, for example, $\frac{3}{32}''$ diameter brass rod is provided with threads at the lower end for threadably mating with the internal threads of the sleeve 46. A nut 49 is threaded over the threaded end of the valve stem 48 and fixedly captured on the valve stem 48 between the upper end of the sleeve 46 and the end of the lower threads on the valve stem 48. The nut 49 is attached to a non-kinkable chain 51 for attachment at the other end to the flush lever 9. The upper end of the valve stem 48 is inserted within a vertically aligned opening in a conventional guide sleeve 52 carried from the stand pipe or overflow pipe 17.

In operation depression of the flush lever handle 14, not shown, raises the ball valve 45 through the intermediary of the chain 51 and stem 48. The ball valve 45 due to its own buoyancy will remain in the raised position and drop with the receding water level to close off the discharge pipe 2 by being seated in the valve seat 4. The flush lever will immediately drop to its lowermost extent of travel after actuation thereof, as in the conventional flushing devices.

The lower ball valve guide 47 and stem 48, resiliently coupled to the ball valve 45 through the intermediary of the sleeve 46, ride in slidable engagement with the discharge pipe 2 and guide 52 respectively to provide positive guidance for the ball valve 45 throughout substantially its entire extent of translation. The nut 49 serves to limit the upward extent of translation of the ball valve 45 by engagement with the guide 52.

The particular embodiment of the present invention depicted in FIGURE 8 is especially useful as a modification of existing ball valve installations as by merely supplying the lower guide 47, nut 49 and chain 51 a conventional ball valve apparatus may be modified to incorporate the features of the present invention.

Referring now to FIGURES 9 and 10 there is shown another embodiment of the present invention. In particular, the water discharge pipe 2 with flared entrance forming the valve seat 4 is adapted to receive a hollow ball valve 61 as of, for example, rubber for closing off the flow of water through the discharge pipe 2.

A valve stem 62 having a lower threaded end portion is threadably mated with the internal threads of the ball valve 61 and at the other end thereof is slidable within a lifting eye 63 carried from a flush valve actuating lever 64. A sleeve 65 is slidable upon valve stem 62 on the upper end thereof above the lifting eye 63 and is provided with a thumb set screw 66 for selectively fixedly securing the sleeve 65 upon the valve stem 62 to thereby provide an adjustable stop for engagement with the lifting eye 63. The adjustable sleeve 65 forms the subject matter of the aforementioned continuation in part application, U.S. Serial No. 167,847. The upper end of the valve stem 62 is provided with a rubber bumper 67 to eliminate metallic noises otherwise produced by contact between the metallic valve stem 62 and the typically porcelain top of the flush tank, not shown.

A rod 68 forming a valve stem extension, is resiliently affixed to the ball valve 61 via the intermediary of a centrally bored resilient adaptor 69, as of, for example, rubber secured centrally and internally of the ball valve 61 as by, for example, rubber cement. The valve stem extension 68 is secured within the central bore of the adaptor 69 and extends centrally and longitudinally of and through the hollow ball valve 61 into the discharge pipe 2. The valve stem extension 68 extends a sufficient distance below the ball valve 61 such that in the uppermost extent of travel of the ball valve 61 the lower extremity of the valve stem extension 68 remains within the discharge pipe 2.

Two quadraturally spaced diamond shaped vanes 71 (see FIGURE 10) are carried from the lower portion of the valve stem extension 68 as by being brazed thereto. The vanes 71 catch the discharging water within the discharge pipe 2 in such a way to cause the vanes to be rapidly rotationally deflected about the center of the discharge pipe 2 as the vanes are alternately deflected from the sides of the discharging water whirlpool within the discharge pipe toward a stable central position. This rapid oscillatory jiggling motion, about the center line of the valve seat, imparted to the ball valve 61 via the vanes 71 and valve stem extension 68, further assures a positive seating of the ball valve seat 4. It has been found that the resilient coupling between the ball valve 61 and the valve extension 68 and vanes 71 assures that this oscillatory deflection of the vanes 71 is transmitted via the valve stem extension 68 to the ball valve 61 whereby the positive seating of the ball valve 61 is assured.

In operation, upward movement of flush valve actuation lever 64 causes lifting eye 63 to engage stop 65 thereby raising the ball valve 61 via stem 62 to the uppermost extent of travel determined by contact between bumper 67 and the top of the flush tank, not shown. The vanes 71 during the upward travel of the ball valve 61 are retained within the discharge pipe 2 to assure sufficient guidance for the ball 61 such that when the ball drops into the valve seat 4 with the receding water, the ball valve 61 will not be caught and improperly lodged on the valve seat 4. As the receding ball valve 61 approaches the valve seat 4, the discharging water in discharge pipe 2, as previously described, causes the vanes to be subjected to a rapid oscillatory motion and combined centering action which is imparted to the ball valve 61 through the intermediary of the valve stem extension 68. In this manner, the ball valve 61 is jiggled into a centered positive seating within the valve seat 4.

Referring now to FIGURE 11 there is shown an alternative embodiment of the present invention which is substantially identical to the structure of FIGURES 9 and 10 with the exceptions that the valve stem 70 extends through the ball valve 61 and is resiliently connected thereto via mating threads centrally located on the valve stem 70 and that the vanes 71 of FIGURES 9 and 10 have been replaced in the structure of FIGURE 11 by a ball 72 fixedly secured to the lower extremity of the valve stem 70 as by, for example, mating threads or cement.

The action of the ball 72, which is resiliently coupled to the ball valve 61 via the intermediary of the valve stem 70, is substantially the same as the action of the vanes 71, previously described with regard to the structure of FIGURES 9 and 10. In particular, the discharging water through the discharge pipe 2 causes the ball 72 to be rapidly and rotationally deflected from one side wall of the discharging water whirlpool to the other in a rapid oscillatory manner about the center of the vortex. These rapid oscillating deflections are transmitted via the resilient coupling to the ball 61 as a jiggling of the ball valve about the axial center line of the valve seat 4 to assure proper seating of the ball 61 in the valve seat 4 as the ball 61 drops with the receding water. The ball 72 is positioned a sufficient distance below the ball valve 61 such that in the uppermost extremity of travel of the ball valve 61, the ball 72 rides within the discharge pipe 2 to prevent lateral disengagement of the lower guide ball 72 with the discharge pipe 2.

Referring now to FIGURES 12 through 14 there is shown a flush valve apparatus having preferred ball valve lifting, guiding, and upper limit stop features. In particular, there is shown a standard hollow ball valve 75 having a valve stem 76 fixedly secured thereto and extending coaxially thereof and through the ball valve 75. The valve stem 76 has a portion of its length depending from the ball valve 75 and serving as a lower ball valve guide 77.

The lower ball valve guide 77 includes a flat vane member 78 preferably of substantially diamond shape and is carried from the lower extremity of the valve stem 76 by being fixedly secured at an apex to said valve stem as by, for example, soldering. A guide wire 79 bent substantially onto a diamond shape is quadraturally spaced with respect to said vane member 78 and may either be formed from a portion of the valve stem 76 or be formed from a separate wire fixedly carried from the lower extremity of the valve stem 76 as by, for example, soldering.

The upper extremity of the valve stem 76 extends through the eye of a cotter pin 81 forming the valve stem lifting eye. Cotter pin 81 is carried from the flush lever 9 by being inserted through one of the suitable holes therein, the leg portions of the cotter pin 81 then being spread apart to capture the pin 81 on the lever 9. The eye of the cotter pin 81 is suitably dimensioned to freely slide upon the valve stem 76.

A sleeve 82 is slidably carried upon the valve stem 76 above the lifting eye 81, the outside diameter of the sleeve being greater than the inside diameter of the lifting eye 81 such that the sleeve 82 will be carried upwardly by upward movement of the lifting eye 81. The upper extremity of the valve stem 76 is bent over in the form of a hook 83, the radius of curvature of the hook portion being small enough such that the sleeve member 82 will be captured on the valve stem 76 and cannot slide around the hook portion 83 of the valve stem 76. A sleeve member 84 as of, for example, a soft sound deadening material is secured over the hook portion 83 of the valve stem 76 to serve as a sound deadening bumper, in case the upper extremity of the valve stem 76 should make contact with portions of the flush tank and otherwise produce objectionable metallic noises associated with flushing of the tank.

In one mode of operation of the apparatus, shown in FIGURES 12 through 14, the upper hook portion 83 of the valve stem 76 serves as the upper ball valve travel limit stop by making physical contact with the lid of the flush tank or other suitable limit stop apparatus disposed above and in vertical alignment with the valve stem 76. In this mode of operation, the length of the valve stem 76 is proportioned such that, in the upper extent of travel of the ball valve 75, the lower ball valve guide 77 is laterally retained within the confines of the water discharge pipe 2 such that proper lateral guidance of the ball valve 75 is assured during descent of the ball valve 75 into the valve seat 4.

Lower ball valve guide 77 functions similarly to the previously dscribed lower guide as shown in FIGURE 9. In particular, vane member 78 is caught up in the vortex of the discharging water, within the discharge pipe 2, thereby serving to impart to rapid oscillatory motion to the ball valve 75 through the intermediary of the lower guide 77 and valve stem 76. The oscillatory motion is rapid and centers around the axial center line of the discharge pipe such as to jiggle the ball valve 75 into a positive seating in the valve seat 4.

An alternative preferred ball valve limit stop apparatus is shown in FIGURES 12 and 14. In particular, the conventional upper valve stem guide 85, which is carried from the overflow pipe 17, is moved to one side out of vertical alignment with the valve stem 76.

An eyelet 86 having an L-shaped stem 87 has one leg of the L-shaped stem portion inserted upwardly through the guide sleeve portion of the conventional valve stem guide 85. The protruding portion of the L-shaped stem 87 is threaded to receive a wing nut 88 thereon, which serves to capture the valve travel stop eyelet 86 on the conventional guide 85. Valve travel stop eyelet 86 stops the upper travel of the ball valve 75 by making physical contact with the ball valve 75 and since the eyelet 86 is restrained from further upward movement by the guide 85, the ball is thereby stopped. Valve travel stop eyelet 86 may be made complete or in part for attaching and dimensioned, arranged, and connected for operation in one of two possible modes of operation.

In the limit stop's first mode of operation, the eyelet 86 is made only moderately larger in diameter than the valve stem 76 slidable therethrough. The wing nut 88 is not tightened down against the sleeve portion of the conventional stem guide 85 such that the eyelet 86 and its L-shaped stem 87 are free floating in the guide 85. In this manner, as the flush lever 9 is actuated and the valve stem 86, due to its free floating action, swings laterally with upward movement of the ball valve 75, as depicted in phantom lines, there is no guiding or lateral restraining force exerted on the valve stem 76 by the eyelet stop 86. The eyelet stop 86 freely swings outwardly of the overflow pipe 17 to accommodate the lateral movement of the ball valve 75 and valve stem 76 to prevent any tendency to bind the valve stem 76.

In the limit stop's second mode of operation the opening in the eyelet 86, through which the valve stem 76 operates, is made large enough in diameter to accommodate the largest expected lateral translations of the valve stem 76, in use, thereby preventing any substantial restraint on the lateral movement of the valve stem 76, which otherwise might produce binding of the ball valve 75 between the upper and lower guides, 81 and 77 respectively, of ball valve 75. When the eyelet stop 86 is operated in this second mode of operation, the wing nut 88 may be tightened down securely against the sleeve portion of the conventional valve stem guide 85 thereby fixedly locking the enlarged eyelet stop in position.

By providing the aforementioned, non-laterally restraining ball valve stop 86, an extremely simple and inexpensive stop is formed which will not bind the valve stem 76 or otherwise interfere with proper guidance of the ball valve 75 into a proper seat within valve seat 4.

Although the features of the present invention have been explained as applied to the conventional hollow ball valve it is readily apparent that the features of the present invention are equally applicable to other ball valves such as, for example, the solid spherical ball valve by suitable obvious modifications thereof.

The foregoing detail description of the inventoin is not to be taken as restrictive of the same as it is obvious that minor variations and design may be made without departing from the spirit of the invention.

The present application is a continuation in part of my earlier filed application Serial Number 852,858, filed November 13, 1959, which in turn is a continuation in part application of my original application Serial Number 832,937, filed August 11, 1959. The aforementioned prior applications have been abandoned in favor of the present application.

What is claimed is:

1. A toilet flush valve apparatus including, a flush tank, a water discharge pipe provided in the bottom of said flush tank, a valve seat in said water discharge pipe, a movable buoyant bail valve for selectively closing off said water discharge pipe by being seated in said valve seat, a valve stem affixed to and vertically extending from said ball valve, a lifting eye for translating said ball valve vertically as desired to open said water discharge pipe, a flush lever for carrying said lifting eye therefrom, said lifting eye being slidable on said valve stem, means for connecting said lifting eye to said flush lever, said connecting means including means for restraining substantial movement of said eye laterally of said valve stem thereby forming an upper substantially laterally restraining ball valve stem guide, means for guiding said ball valve resiliently coupled thereto and extending below said ball valve into said water discharge pipe for being laterally retained by the inside walls of said water discharge pipe for the entire extent of vertical translation of said ball valve thereby serving as a lower ball valve guide, and said upper lifting eye guide and said lower ball valve guide cooperating to assure correct lateral guidance of said ball valve as said ball valve settles into said valve seat, a vertically directed overflow pipe disposed within said flush tank, and means forming a substantially nonlaterally restraining ball valve travel limit stop secured to said overflow pipe and having a portion thereof positioned between said ball valve and said upper ball valve guide for limiting the rectilinear travel of said ball valve to a certain predetermined extent and preventing lateral disengagement of said lower ball valve guide means with said water discharge pipe.

2. The apparatus according to claim 1 wherein said valve travel limit stop includes a free floating eyelet disposed in free slidable engagement with said valve stem.

3. The apparatus according to claim 1 wherein said valve travel limit stop includes a fixedly positioned eyelet in substantially noncontacting relationship with said valve stem passable therethrough.

4. A toilet flush valve apparatus including, a flush tank, a water discharge pipe provided in the bottom of said flush tank, a valve seat in said water discharge pipe, a movable buoyant ball valve for selectively closing off said water discharge pipe by being seated in said valve seat, a valve stem affixed to and vertically extending from said ball valve, a lifting eye for translating said ball valve vertically as desired to open said water discharge pipe, a flush lever for carrying said lifting eye therefrom, said lifting eye being slidable on said valve stem, means for connecting said lifting eye to said flush lever, said connecting means including means for restraining substantial movement of said eye laterally of said valve stem thereby forming an upper substantially laterally restraining ball valve stem guide, means for guiding said ball valve resiliently coupled thereto and extending below said ball valve into said water discharge pipe for being laterally retained by the inside walls of said water discharge pipe for the entire extent of vertical translation of said ball valve thereby serving as a lower ball valve guide, and said upper lifting eye guide and said lower ball valve guide cooperating to assure correct lateral guidance of said ball valve as said ball valve settles into said valve seat, means positioned over said valve stem to limit the rectilinear travel of said ball valve to a certain predetermined extent, and means forming a sound deadening bumper provided on the upper extremity of said valve stem to eliminate undesired noises accompanying lifting of said ball valve.

5. In a flush valve apparatus for a toilet the toilet having a flush tank selectively discharged as desired by operation of a flush lever within the flush tank the flush lever being operatively connected to said flush valve apparatus serving to selectively open and close off as desired a discharge pipe in fluid communication with the flush tank and having an overflow pipe and the flush valve apparatus including, a removable buoyant ball valve for selectively closing off the water discharge pipe by being seated in the discharge pipe, a valve stem adapted to be affixed to and vertically directed from said ball valve, a lifting eye for translating said ball valve vertically as desired to open the water discharge pipe, means for connecting said lifting eye to the flush lever, said connecting means including means for restraining substantial movement of said lifting eye laterally of said valve stem thereby forming an upper substantially laterally restraining ball valve stem guide by being slideable on said valve stem, means for guiding said ball valve resiliently coupled thereto and adapted to extend below said ball valve into the water discharge pipe for being laterally retained by the inside walls of the water discharge pipe for substantially the entire extent of vertical translation of said ball valve thereby serving as a lower ball valve guide, said upper lifting eye and said lower ball valve guide cooperating to assure correct lateral guidance of said ball valve as said ball valve settles into the water discharge pipe, means forming a substantially nonlaterally restraining ball valve travel limit stop adapted to be secured to the overflow pipe within the flush tank and said ball valve limit stop means adapted to be positioned in between said ball valve and said lifting eye for limiting the rectilinear travel of said ball valve to a certain predetermined extent and preventing lateral disengagement of said lower ball valve guide means and the water discharge pipe.

References Cited in the file of this patent

UNITED STATES PATENTS

| | | |
|---|---|---|
| 713,832 | Bailey | Nov. 18, 1902 |
| 849,707 | Willms | Apr. 9, 1907 |
| 1,586,193 | Gove | May 25, 1926 |
| 2,139,862 | Shesler | Dec. 13, 1938 |
| 2,155,902 | Kass | Apr. 25, 1939 |
| 2,230,613 | Deady | Feb. 4, 1941 |
| 2,512,924 | Dysart | June 27, 1950 |
| 2,526,936 | Crandall | Oct. 4, 1950 |
| 2,760,205 | Tegarty | Aug. 28, 1956 |
| 2,832,963 | Minella | May 6, 1958 |
| 2,919,447 | Wells | June 5, 1960 |